United States Patent [19]

Smith

[11] Patent Number: 4,502,259

[45] Date of Patent: Mar. 5, 1985

[54] TRIM STRIP WITH POSITIONING LEG

[75] Inventor: Donald E. Smith, Englewood, Ohio

[73] Assignee: Protective Treatments, Inc., Dayton, Ohio

[21] Appl. No.: 338,234

[22] Filed: Jan. 11, 1982

[51] Int. Cl.³ .......................... E04C 2/38; E04C 5/07; E06B 3/62
[52] U.S. Cl. .................................. 52/208; 52/173 R; 52/397; 52/403; 52/417; 52/718
[58] Field of Search ............... 52/208, 400, 403, 468, 52/417, 379, 420, 204, 397, 173 R, 718; 428/7, 31, 297, 521, 231, 40; 296/93

[56] References Cited

U.S. PATENT DOCUMENTS

| | | | |
|---|---|---|---|
| 2,848,761 | 8/1958 | Hahn | 52/208 |
| 3,287,867 | 11/1966 | Aton | 52/716 |
| 3,434,903 | 3/1969 | Hann | 52/208 X |
| 3,744,201 | 7/1973 | Dochnahl | 52/400 |
| 3,759,004 | 9/1973 | Kent | 52/716 |
| 3,851,432 | 12/1974 | Griffin | 52/400 |
| 4,287,696 | 9/1981 | Mullen | 52/403 |
| 4,358,917 | 11/1982 | Oda et al. | 52/468 |
| 4,364,595 | 12/1982 | Morgan et al. | 52/208 X |

Primary Examiner—Alfred C. Perham
Attorney, Agent, or Firm—Dressler, Goldsmith, Shore, Sutker & Milnamow, Ltd.

[57] ABSTRACT

A combination of a window glass with a trim strip intended to conceal the juncture between the window glass and the panels which define a body opening in a vehicle is disclosed in which the trim strip is formed with an inwardly projecting portion which is adhesively secured to the upper surface of the window glass adjacent its edge, an outwardly projecting portion which is intended to overlie the vehicle body panels adjacent the body opening therein, and a centrally located downwardly projecting positioning leg which bears against the edge of the window glass to correctly position the trim strip with respect to the glass. In preferred practice a rubber dam is adhered to the undersurface of the window glass adjacent its edge and the outer face of the positioning leg is formed with one or more protuberances which interlock with a sealant which is carried by the flanged body panels of the vehicle. Also, the undersurface of the inwardly projecting portion is recessed and an elastomeric layer is positioned within the recess to provide the desired adhesive securement to the glass.

4 Claims, 2 Drawing Figures

TRIM STRIP WITH POSITIONING LEG

DESCRIPTION

1. Technical Field

This invention relates to a combination of a window glass with a decorative molding or trim strip which is intended to conceal the juncture between the window glass and the panels which define a body opening in a vehicle.

2. Background Art

The mounting of window glass on the pinch weld flange of openings in the body of an automotive vehicle, such as the front and rear windshields, presents a common problem which has perplexed the automotive industry from its inception. The window glass must be mounted easily and securely and the juncture between the window glass and the vehicle body panels must be concealed.

In one form of mounting, as illustrated in U.S. Pat. No. 3,851,432 issued Dec. 3, 1974 and U.S. Pat. No. 4,035,017 issued July 12, 1977, a rubber dam is adhesively secured to the underside of the window glass and a sealant or curable adhesive is applied to fill the space defined by the rubber dam, the undersurface of the window glass, the trim strip and the upper surface of the supporting pinch weld flange.

The rubber dam and the adhesive are unsightly, and it is desired to insure their concealment by the trim piece. Also, it is desired to preassociate the trim strip with the window glass as an aid to properly positioning the composite structure within the body opening in the vehicle, thereby minimizing the number of "on-line" operations.

DISCLOSURE OF INVENTION

In accordance with this invention, a trim strip is formed with an inwardly projecting portion which is adhesively secured to the upper surface of the window glass adjacent its edge, an outwardly projecting portion which is intended to overlie the vehicle adjacent the body opening therein, and a centrally located downwardly projecting positioning leg which bears against the edge of the window glass to correctly position the trim strip with respect to the glass.

The lower surface of the inwardly projecting portion is desirably recessed and contains an elastomeric adhesive layer such as a layer of plasticized and filled butyl rubber, which will provide the desired adhesion to the glass. This adhesive layer is covered with a release or separating liner prior to use.

While any adhesive can be used, a pressure-sensitive adhesive coated pigmented layer is preferred because it is energy absorbing, and this protects against separation by minor impact. These energy absorbing layers are disclosed in U.S. Pat. Nos. 3,896,245 and 4,061,805.

The window glass is then mounted on the pinch weld flange which surrounds the body opening in the automobile in any desired fashion, and several mounting techniques are available. As a feature of this invention, a rubber dam is adhered to the undersurface of the window glass adjacent its edge, and this is used in combination with a flowable sealant which is usually positioned on the pinch weld flange. This sealant is used in an amount to fill the space which is expected to exist when the glass and the associated trim strip and dam are pressed into place. This causes the sealant to surround the positioning leg, and when the sealant solidifies, the structure is locked together.

It will be understood that the preassociation of the trim strip, and preferably also the rubber dam, with the window glass serves to minimize the number of "on-line" operations which are steps performed upon the automobile on the assembly line, and this is desirable in automobile assembly practice.

The sealant is usually used in the form of a semi-liquid flowable bead which is normally applied to the pinch weld flange.

While flowable sealants are preferred, one may also employ elastomer strands which have been plasticized and pigmented to be adhesive and to resist cold flow so that the strand will adhere to the pinch weld flange and also to the glass while possessing sufficient strength to support the glass. These strands and their use for this purpose is well known for the mounting of window glass, but it will be understood that they do not provide the locking function noted previously.

The inner face of the positioning leg is preferably flat so that it can abut the edge of the glass when the two are preassociated. The outer face of the positioning leg may also be flat, or it may be formed with one or more protuberances or prongs which interlock with the sealant to help mechanically secure the trim strip in the sealant.

The semi-liquid sealant material flows around the positioning leg as the associated glass and trim strip is forced into place, and it cures (either with time or with the aid of elevated temperature) to solidify and lock the structure together. These sealants or curable adhesives are known materials and are illustrated in the patents noted previously. However, it will be appreciated that when the trim strip is preassociated with the glass, that the problem of having the edge of the glass too close to the margin of the body opening as to prevent insertion of the positioning leg is prevented.

The invention will be more fully understood from the accompanying drawings in which.

Figure 1:
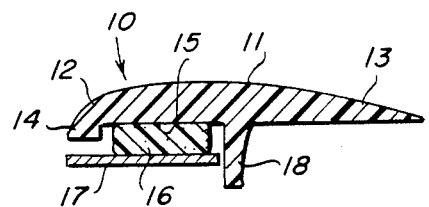
FIG. 1 is a cross-section of an elongated trim strip in accordance with this invention and showing an elastomeric adhesive layer associated with the strip and protected by a release liner.

Referring more particularly to FIG. 1, the trim strip 10 is a plastic extrusion and its upper face 11 can be decorated as desired. The lower face of the strip 10 is formed to define a first projecting portion 12 which extends inwardly of the glass, and a second projecting portion 13 which extends outwardly of the glass. The outwardly projecting portion 13 is flexible and is intended to overlie the body panels of a vehicle to conceal the space between the glass and these body panels. The undersurface of the inwardly extending portion 12 is shaped to define a lip 14 which will contact the glass and a recess 15 which receives an elastomeric layer 16. The elastomeric layer 16 is covered by a release liner 17 which is removed prior to use.

Extending downwardly from the center of the trim strip 10 is a positioning leg 18. This leg may have any desired length and its shape may be varied, a short leg of rectangular shape being shown in FIG. 1. A longer leg 18' having prongs 19 is shown in FIG. 2.

It is preferred to preassociate the trim strip with the upper edge of the glass and a rubber dam with the lower edge of the glass. This rubber dam 20 is adhesively secured to the glass. The result is a combination of three elements, namely: the glass, the trim strip on its upper edge, and the rubber dam on the undersurface near the edge and spaced a short distance inwardly thereof. This combination is handled as a unit and it is positioned on the pinch weld flange 21 which is recessed inwardly of body panels 22 which define an opening in the body of the automobile. The marginal portion of the window glass is identified at 23. The sealant is extruded on the pinch weld flange 21 as a bead of semi-liquid material 24, and it flows when the combination of glass, trim strip and dam is pressed against it.

Urethane-forming mixtures are preferred, and these solidify with time to lock the structure together. When prongs 19 are present, the locking action is particularly pronounced.

Figure 2:
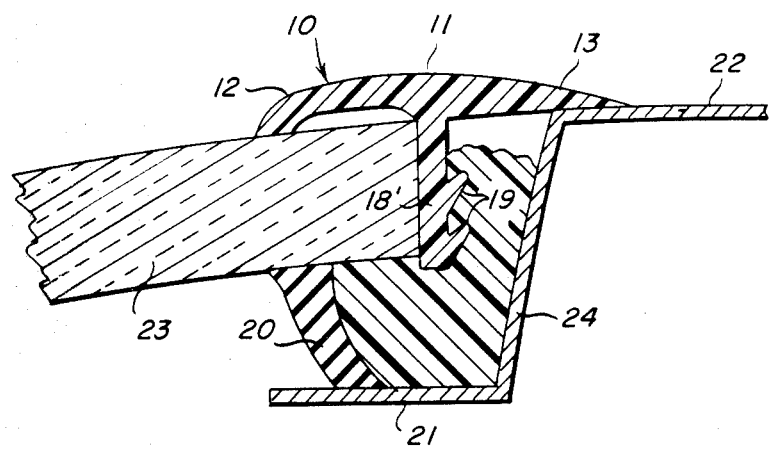
FIG. 2 is a cross-section similar to FIG. 1 but showing a variation of the trim strip of FIG. 1 preassociated with a window glass having a rubber dam on its lower surface and mounted by means of a semi-liquid adhesive on the pinch weld flange of a body opening in an automotive vehicle.

As will be apparent, the overall assembly is shown in FIG. 2. It will be appreciated that this figure shows an edge of the glass where it and the pinch weld flange are straight, but it is also necessary for these elements to curve around the corners of the window. In these curved portions, the inwardly projecting portion 12 is compressed, and it may accomodate this compression if the curvature is not excessive. For sharper curves, the portion 12 may be cut to form wedge-shaped notches which close as the strip 10 is bent around the curve. The outer portion 13, having limited extensibility, may be stretched to accomodate the curve. It is also possible to employ separate molded escutcheons to go around a sharply curved corner. In any event, the handling of corners is not a feature of this invention.

What is claimed is:

1. A combination of a window glass with a trim strip which is intended to conceal the juncture between the window glass and the panels which define a body opening in a vehicle and a rubber dam adhered to the undersurface of the window glass adjacent its edge comprising, a trim strip formed with an inwardly projecting portion having a lower surface which is adhesively secured to the upper surface of the window glass adjacent its edge, an outwardly projecting portion which is intended to overlie the vehicle body panels adjacent the body opening therein, and a centrally located downwardly projecting positioning leg which bears against the edge of the window glass to correctly position the trim strip with respect to the glass, said positioning leg being formed with one or more protuberances adapted to interlock with a curable sealant.

2. A combination as recited in claim 1 in which said positioning leg has a flat inner face.

3. A combination as recited in claim 1 in which the lower surface of said inwardly projecting portion is recessed to receive an elastomeric adhesive layer which adheres said trim strip to the glass.

4. In a motor vehicle body having a body opening defined by flanged body panels, a window glass mounted in said body opening for closing said opening and when mounted therein providing a space between the edge of the window glass and the body panels, a curable adhesive mounting the window glass to the flanged body panels, and a dam confining said adhesive, said window glass being associated with a trim strip formed with an inwardly projecting portion having a lower surface which is adhesively secured to the upper surface of the window glass adjacent its edge, an outwardly projecting portion overlying the vehicle body panels adjacent the body opening therein, and a centrally located downwardly projecting positioning leg which bears against the edge of the window glass to correctly position the trim strip with respect to the glass, the positioning leg of said trim strip being embedded in said curable adhesive, said positioning leg being formed with one or more protuberances which interlock with said curable adhesive.

* * * * *